United States Patent
Rodriguez

(10) Patent No.: US 11,895,569 B2
(45) Date of Patent: *Feb. 6, 2024

(54) LOW OVERHEAD CONTROL CHANNEL FOR WIRELESS AUDIO SYSTEMS

(71) Applicant: Shure Acquisition Holdings, Inc., Niles, IL (US)

(72) Inventor: Michael Rodriguez, Arlington Heights, IL (US)

(73) Assignee: Shure Acquisition Holdings, Inc., Niles, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/676,639

(22) Filed: Feb. 21, 2022

(65) Prior Publication Data

US 2022/0337985 A1 Oct. 20, 2022

Related U.S. Application Data

(63) Continuation of application No. 16/803,788, filed on Feb. 27, 2020, now Pat. No. 11,259,164.

(51) Int. Cl.
*H04W 4/80* (2018.01)
*H04L 1/00* (2006.01)
(Continued)

(52) U.S. Cl.
CPC ............ *H04W 4/80* (2018.02); *H04L 1/0003* (2013.01); *H04L 5/0064* (2013.01);
(Continued)

(58) Field of Classification Search
CPC ............... H04W 4/80; H04W 72/0453; H04W 36/0027; H04W 36/0009; H04W 74/0833; H04W 72/0446; H04L 5/0064; H04L 1/0002; H04L 1/0003; H04L 1/0015; H04L 5/0091; H04L 5/0044
See application file for complete search history.

(56) References Cited

U.S. PATENT DOCUMENTS

| 6,125,148 A | 9/2000 | Frodigh |
|---|---|---|
| 6,456,627 B1 | 9/2002 | Frodigh |
| (Continued) | | |

FOREIGN PATENT DOCUMENTS

| CN | 102630057 | 8/2012 |
|---|---|---|
| CN | 208112924 | 11/2018 |
| (Continued) | | |

OTHER PUBLICATIONS

International Search Report and Written Opinion for PCT/US2021/019794 dated Jun. 21, 2021, 10 pp.

*Primary Examiner* — Brian D Nguyen
(74) *Attorney, Agent, or Firm* — Banner & Witcoff, Ltd.

(57) ABSTRACT

A wireless audio system using low overhead in-band control and audio transmission is provided. The wireless audio system includes a first wireless audio device configured to operate separate physical layer channels for audio data and control data, and transmit the audio data and control data using a single wideband carrier. The wireless audio system also includes one or more second wireless audio devices configured to receive the audio data and control data, and execute an instruction based on the control data.

20 Claims, 5 Drawing Sheets

(51) Int. Cl.
  *H04L 5/00* (2006.01)
  *H04W 36/00* (2009.01)
  *H04W 72/04* (2023.01)
  *H04W 74/08* (2009.01)
  *H04W 72/0446* (2023.01)
  *H04W 72/0453* (2023.01)

(52) U.S. Cl.
  CPC ... *H04W 36/0009* (2018.08); *H04W 36/0027* (2013.01); *H04W 72/0446* (2013.01); *H04W 72/0453* (2013.01); *H04W 74/0833* (2013.01)

(56) References Cited

U.S. PATENT DOCUMENTS

| | | |
|---|---|---|
| 6,807,676 B1 | 10/2004 | Robbins |
| 7,120,162 B1 | 10/2006 | Katibian |
| 7,787,605 B2 | 8/2010 | Rodman |
| 7,844,292 B2 | 11/2010 | Shamburger |
| 10,237,029 B2* | 3/2019 | Atungsiri .............. H04L 5/0048 |
| 2002/0116198 A1 | 8/2002 | Gutwillinger |
| 2005/0027888 A1 | 2/2005 | Juszkiewicz |
| 2006/0147028 A1* | 7/2006 | Hancock .......... H04M 1/72418 379/387.01 |
| 2007/0080745 A1* | 4/2007 | French ................ H03G 3/3021 330/10 |
| 2008/0101459 A1 | 5/2008 | Kwon |
| 2008/0159186 A1* | 7/2008 | Steer .................. H04L 25/0202 370/297 |
| 2009/0111410 A1* | 4/2009 | Kobayashi ........... H04B 1/1036 455/214 |
| 2009/0186644 A1 | 7/2009 | Suga |
| 2010/0232618 A1 | 9/2010 | Haartsen |
| 2013/0031441 A1 | 1/2013 | Ngo |
| 2014/0056451 A1 | 2/2014 | El-Hoiydi |
| 2014/0244014 A1 | 8/2014 | Weitz |
| 2015/0280904 A1 | 10/2015 | Tang |
| 2016/0142237 A1* | 5/2016 | Atungsiri ........... H04L 27/2663 375/260 |
| 2016/0269828 A1 | 9/2016 | Smith |
| 2016/0295516 A1* | 10/2016 | Su ....................... H04W 52/24 |
| 2019/0104424 A1 | 4/2019 | Hariharan |

FOREIGN PATENT DOCUMENTS

| | | |
|---|---|---|
| CN | 109413555 | 3/2019 |
| KR | 20150130894 | 11/2015 |
| KR | 101685082 | 12/2016 |

* cited by examiner

LOW OVERHEAD CONTROL CHANNEL FOR WIRELESS AUDIO SYSTEMS

CROSS-REFERENCE

This application is a continuation of U.S. patent application Ser. No. 16/803,788, filed on Feb. 27, 2020, now U.S. Pat. No. 11,259,164 issued Feb. 22, 2022, the contents of which are incorporated herein by reference in their entirety.

TECHNICAL FIELD

This application generally relates to a wireless audio system that can include a plurality of subscriber devices and a base station. The base station and one or more of the subscriber devices is configured to transmit both audio data and control data. In particular, this application relates to a wireless audio system in which the audio data and control data are transmitted on the same wideband carrier.

BACKGROUND

Audio production can involve the use of many components, including microphones, wireless base stations, wireless subscriber devices, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless base stations to the wireless subscriber devices. The wireless base station can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless base stations, wireless subscriber devices, wireless microphones, and other portable wireless communication devices include antennas for transmitting and receiving radio frequency (RF) signals which contain digital or analog signals, such as modulated audio signals, data signals, and/or control signals. Users of portable wireless communication devices include stage performers, singers, actors, news reporters, and the like.

A wireless base station may transmit an RF signal that includes an audio signal to one or more wireless subscriber devices. The wireless base station may be included in a wireless handheld microphone or body pack, for example, that is held or worn by the user and includes an integrated transmitter and antenna. As another example, the wireless base station may be included in an access point, rack mounted transceiver, or other centralized unit. The wireless subscriber devices may be portable devices such as wireless earphones, wireless conference units, body packs, in-ear wireless monitors, microphones, intercom devices, and more.

In addition to the transmission and reception of audio data, audio systems may also require the transmission of various types of control information. The control information, or control data, can be used to control a volume, transmit battery life data, encryption keys, and more, to enable the base station and subscriber device(s) to operate properly. In some examples, the control data is transmitted using an out-of-band mechanism separate from the audio data. For example, the control data can be transmitted over a separate communication link, such as via an infrared (IR) or Wi-Fi link. However, these techniques require separate transmission and reception hardware at the transmitter and receiver. In addition, using a separate communication link for the audio data and the control data can lead to mismatched coverage areas due to greater interference on one link than the other, line of sight issues (particularly where the control data is transmitted over an IR link), and more. In other examples, the audio data and control data are multiplexed into a single channel at the physical layer, rather than transmitted using separate communication links. This technique can solve some of the issues noted above, but causes other issues to arise. For example, the combined bit rate of the audio and control data is limited by the physical layer channel, so there is no flexibility in setting the relative link performance for the audio and control data separately.

Accordingly, there is an opportunity for a wireless audio system that utilizes low overhead in band control, that does not require a separate communication link, provides the same coverage area for both the audio data and the control data, and enables independent control of the audio data and control data coding rate and modulation scheme.

SUMMARY

Embodiments of the present disclosure are intended to solve or assist in solving the above-noted problems by providing a wireless audio system that enables the transmission of both audio and control information using a low overhead in-band approach.

In an embodiment, an audio system includes a first wireless audio device (e.g., a base station or a subscriber device) configured to operate separate physical layer channels for audio data and control data, and transmit the audio data and control data using a single wideband carrier. The audio system also includes one or more second wireless audio devices (e.g., one or more base stations or subscriber devices) configured to receive the audio data and control data, and execute an instruction based on the control data.

In some examples, the one or more second wireless audio devices are further configured to operate separate physical layer channels for second audio data and second control data; and transmit the second audio data and the second control data using a single wideband carrier. Furthermore, the first wireless audio device may be configured to receive the second audio data and second control data, and execute an instruction based on the second control data.

In some examples, the first wireless audio device is further configured to use a different modulation scheme and/or coding rate for the audio data and the control data, based on a desired bit error rate.

In some examples, the first wireless audio device is further configured to combine the audio data and the control data into frames, wherein each frame includes a downlink portion and an uplink portion. The frames may be arranged according to a frame scheme, wherein the frame scheme repeats every N frames. Each frame in the frame scheme may include a broadcast channel slot. The broadcast channel slot may include information used by the one or more subscriber devices to access the audio system, including the number of frames N in the frame scheme. Each of the N frames of the frame scheme may include M control channel slot pairs, wherein a first slot of a given control channel slot pair is included in the downlink portion of a given frame, and a second slot of the control channel slot pair is included in the uplink portion of the frame. Each of the one or more second wireless audio devices may be allocated one control channel slot pair.

In a second embodiment, a wireless base station of an audio system may include a processor configured to operate a first physical layer channel using audio data, and operate a second physical layer channel using control data. The wireless base station of the audio system may also include an antenna configured to transmit the audio data and control data using a single wideband carrier.

In some examples, the processor is further configured to use a different modulation scheme and coding rate for the audio data and the control data.

In some examples, the processor may also be configured to combine the audio data and the control data into frames, wherein each frame includes a downlink portion and an uplink portion. The processor may operate using a frame scheme, wherein the frame scheme repeats every N frames. Each frame in the frame scheme may include a broadcast channel slot. The broadcast channel slot may include information used by one or more subscriber devices to access the audio data and control data, including the number of frames N in the frame scheme.

In some examples, each of the N frames of the frame scheme may include M control channel slot pairs, wherein a first slot of a given control channel slot pair is included in the downlink portion of a given frame, and a second slot of the control channel slot pair is included in the uplink portion of the frame. The wireless base station may be configured to communicate with one or more subscriber devices, wherein each of the one or more subscriber devices is allocated one control channel slot pair.

In a third embodiment, a non-transitory, computer readable memory has instructions stored thereon that, when executed by a processor, cause the performance of a set of acts. The set of acts includes operating a first physical layer channel using audio data to be transmitted to a wireless subscriber device. The set of acts also includes operating a second physical layer channel using control data to be transmitted to the wireless subscriber device. The set of acts further includes controlling an antenna to transmit the audio data and control data using a single wideband carrier.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
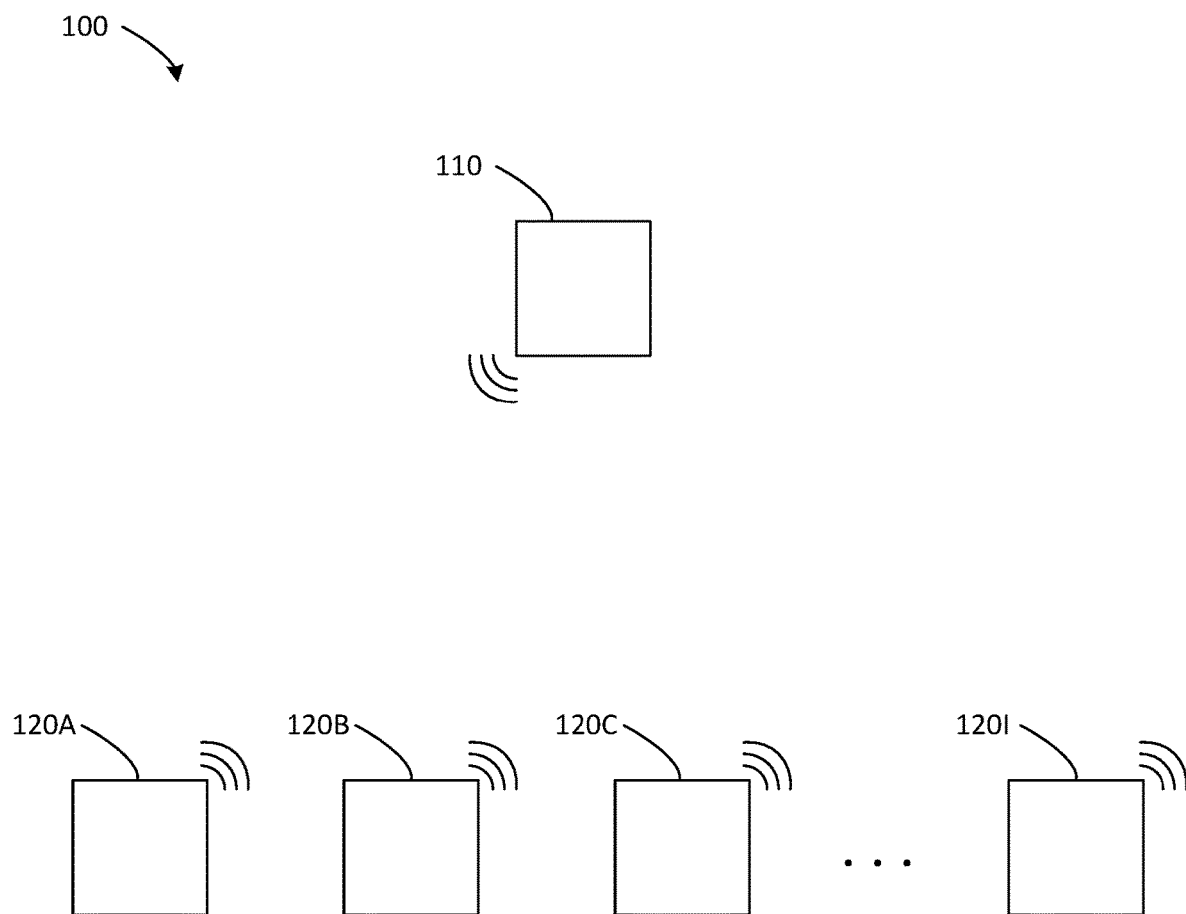
FIG. 1 is a schematic diagram of a wireless audio system, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The wireless audio system described herein can utilize a single RF carrier to transmit both audio data and control data. Multiple audio and control channels can be transmitted together in a single frame. Embodiments of the present disclosure include using separate physical layer channels for audio information and control information, which allows for separate and individual manipulation of the modulation and channel coding rates of the channels. This arrangement enables a user to set initial control channel and audio channel parameters at the time of setting up the wireless audio system, as well as to perform real-time adjustments to control channel and audio channel parameters, and can provide improved functionality for the wireless audio system.

FIG. 1 illustrates a schematic diagram of an exemplary wireless audio system 100 according to embodiments of the present disclosure. The wireless audio system 100 may include a first wireless audio device 110 (also referred to in some embodiments as wireless base station 110), and a plurality of second wireless audio devices 120A-I (also referred to in some embodiments as wireless subscriber devices 120A-I). The first wireless audio device may be a base station such as a wireless access point, a rack mounted transceiver, or any other suitable device. The one or more second wireless audio devices may be subscriber devices such as wireless earphones, wireless conference units, body packs, in-ear wireless monitors, microphones, intercom devices, and more. The wireless audio system 100 may also include an audio source (not shown) in communication with the first wireless audio device 110. The audio source may generate one or more audio source signals, which may include one or both of audio data and control data. The first wireless audio device 110 may modulate the audio data and/or control data received from the audio source.

Figure 2:
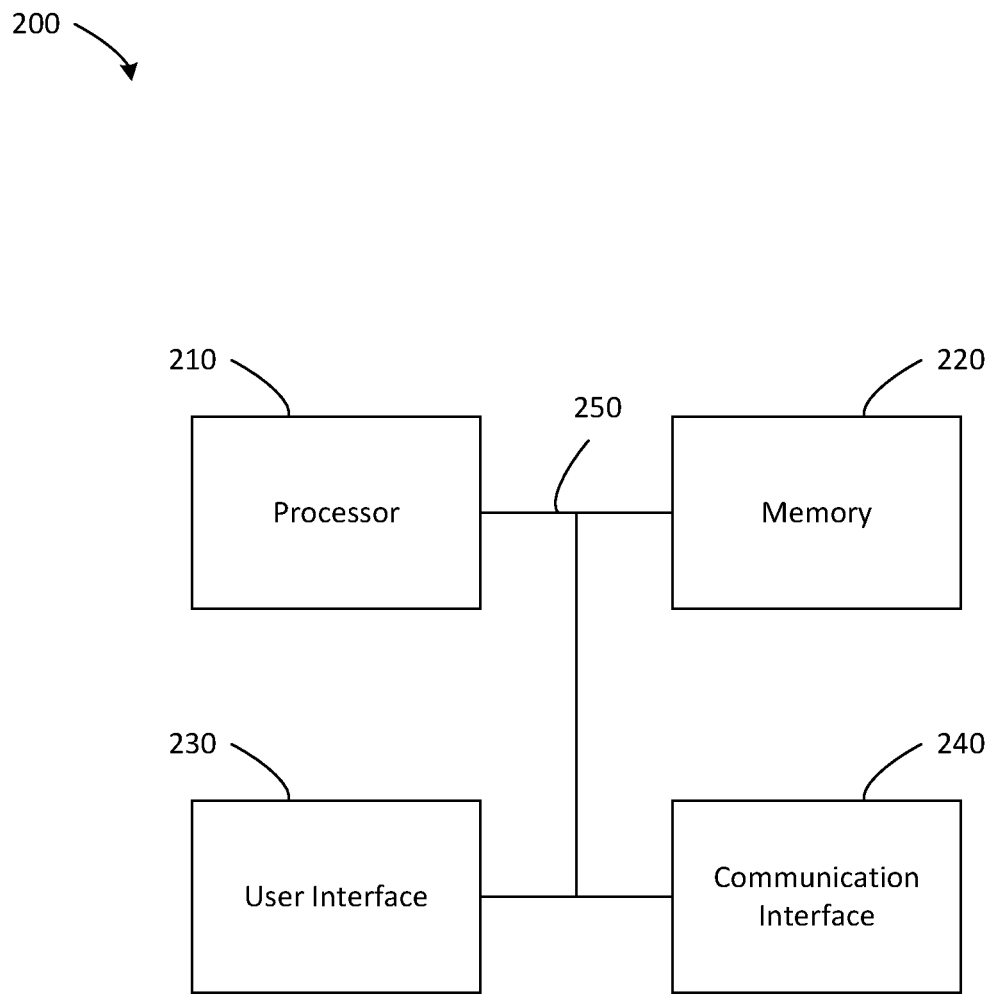
FIG. 2 is a schematic diagram of an example computing device, such as the first wireless audio device, second wireless audio device, base station, and/or subscriber device of the wireless audio system of FIG. 1, in accordance with some embodiments.

The first wireless audio device 110 may be a computing device such as the computing device described in further detail with respect to FIG. 2. In some examples, the first wireless audio device 110 may include one or more antennas. In some examples, the first wireless audio device 110 may utilize antenna diversity, and may use multiple antennas. Antenna diversity can include using physically separated antennas (i.e., antennas positioned apart in space), for example. It is contemplated and possible for the first wireless audio device 110 to have more than two antennas, and for there to be any number of second wireless audio devices 120A-I. The first wireless audio device 110 may be an access point or other centralized unit, in some embodiments. The second wireless audio devices 120A-I may be portable wireless subscriber devices, in some embodiments, such as a wireless earphone, wireless conference unit, or body pack.

In some embodiments, the wireless audio system 100 may be an OFDM (orthogonal frequency-division multiplexing) wideband audio system that allows various types of traffic to be carried on individual subcarriers and multiplexed together into a single wideband carrier. The RF signals transmitted by the first wireless audio device 110 and received by the one or more second wireless audio devices 120A-I may include data symbols having audio data and control data, for example. A data symbol may be a QPSK/QAM-modulated subcarrier that can carry the audio data signals and/or control signals, in some embodiments. As noted below, other modulation schemes and coding rates can be used as well.

As used herein, the audio data can include information used by the plurality of second wireless audio devices 120A-I to output audio (sound) via one or more speakers. The control data can include information used to control the volume, indicated battery life, information related to an encryption key, and more.

As noted above, audio data and control data may both be required for the audio system to function properly. In some cases, the audio data and control data are transmitted and received using separate communication mechanisms, such as by transmitting the audio data via a radio frequency (RF) connection, and transmitting the control data by another mechanism such as infrared (IR), Wi-Fi, or via another "out of band" link. As a result of using two different mechanisms, there may be mismatched coverage areas between the audio data and control data. For example, where the control data is transmitted via IR, a visual line of sight may be required, whereas no line of sight is necessary for the audio data transmitted via the RF carrier.

Alternatively, if a system were instead to transmit the audio data and control data via the same communication mechanism, one method is to multiplex the audio data and the control data together at physical layer. However, this results in a combined bit rate that is limited by the physical layer channel. Additionally, there is no flexibility in setting relative link performance for the audio data and the control data. Further, there is a relatively high overhead due to the inability to dynamically change the performance characteristics associated with one or both of the audio data and control data.

In embodiments of the present disclosure, the audio system 100 is configured to assist in addressing some or all of these issues noted above. For instance, the first wireless audio device 110 is configured to operate separate physical layer channels for the audio data and the control data. This enables each physical layer channel to have a separate modulation scheme and coding rate. For example, the modulation scheme for the audio data can be 16-QAM with rate ¾ coding. Additionally, the modulation scheme for the control data can be QPSK with rate ½ coding. The modulation scheme and coding rate for the audio data and the control data can be the same, or may be different, based on one or more desired operational characteristics.

In some examples, the modulation scheme and coding rate for one or both of the audio data and the control data can be determined based on a desired bit error rate. A particular modulation scheme and coding rate is selected to balance minimizing the error rate while maintaining a sufficient data transmission rate. Selecting a more robust modulation scheme and coding rate (for example, QPSK with rate ½ coding vs. 16-QAM with rate ¾ coding) reduces the bit error rate at a given transmission range, at the expense of reducing the data transmission rate.

In other examples, the modulation scheme and coding rate of one or both of the audio data and the control data can be set based on a desired range of transmission. In this case, the modulation scheme and coding rate is selected to balance maximizing the range while maintaining a sufficient data transmission rate. Selecting a more robust modulation scheme and coding rate reduces the transmission range, but provides an increased transmission rate. In either case, a more robust modulation scheme and coding rate are typically selected for control data relative to audio data, so that the physical layer link can be established and maintained even in channel conditions that result in poor audio channel performance.

The physical layer channels are then combined into a single RF carrier, and transmitted or broadcast to the plurality of second wireless audio devices 120A-I, such that the second wireless audio devices 120A-I receive both the audio data and the control data in the same signal.

The second wireless audio devices 120A-I may be computing devices such as the computing device described in further detail with respect to FIG. 2. In some examples, the second wireless audio devices 120A-I may each include one or more antennas. In some examples, the second wireless audio devices 120A-I may utilize antenna diversity, and may use multiple antennas. Antenna diversity can include using physically separated antennas (i.e., antennas positioned apart in space), for example. It is contemplated and possible for the second wireless audio devices 120A-I to have more than two antennas. The second wireless audio devices 120A-I may be portable wireless subscriber devices, in some embodiments, such as a wireless earphone, wireless conference unit, body pack, in-ear wireless monitors, microphones, intercom devices, and more.

In some examples, the second wireless audio devices 120A-I can receive the audio data and control data transmitted by the first wireless audio device 110. The second wireless audio devices 120A-I may then demodulate, convert, and/or process the received RF signal to generate an analog or digital output audio signal, and control signal. The second wireless audio devices 120A-I are also configured to execute various instructions based on the received control data. For example, the second wireless audio devices may be configured to modify the volume, change the encryption, adjust a timing, and more.

In some examples, the first wireless audio device and the one or more second audio devices may further be configured to operate as transceivers. In this case, the one or more second wireless audio devices may be further configured to operate separate physical layer channels for second audio data and second control data, and transmit the second audio data and the second control data using a single wideband carrier. The first wireless audio device may then be further configured to receive the second audio data and second control data, and execute an instruction based on the second control data. In this manner, where the first wireless audio device is a base station operable as both a transmitter and a receiver, and the one or more second wireless audio devices are subscriber devices operable as both transmitters and receivers, each device can be configured to operate separate physical layer channels for audio data and control data, and transmit both audio data and control data using a single wideband carrier.

FIG. 2 illustrates a simplified block diagram of an example computing device 200, according to embodiments of the present disclosure. One or more of the first wireless audio device 110 and the second wireless audio devices 120A-I may be a computing device such as computing device 200. As such, the first wireless audio device 110 and/or second wireless audio devices 120A-I may include one or more of the components of computing device 200.

Computing device 200 may be configured for performing a variety of functions or acts, such as those described in this disclosure (and accompanying drawings). The computing device 200 may include various components, including for example, a processor 210, memory 220, user interface 230, and communication interface 240, all communicatively coupled by a system bus, network, or other connection mechanism 250. It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device 200 may be physically remote and may be communicatively coupled to the computing device, via the communication interface 240 for example.

Processor 210 may include a general purpose processor (e.g., a microprocessor) and/or a special purpose processor (e.g., a digital signal processor (DSP)). Processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 220 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 220 includes multiple kinds of memory, particularly volatile memory and non-volatile memory.

The memory 220 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 220, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

User interface 230 may facilitate interaction with a user of the device. As such, user interface 230 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system. The user interface 230 may also comprise devices that communicate with inputs or outputs, such as a short-range transceiver (RFID, Bluetooth, etc.), a telephonic interface, a cellular communication port, a router, or other types of network communication equipment. The user interface 230 may be internal to the computing device 200, or may be external and connected wirelessly or via connection cable, such as through a universal serial bus port.

Communication interface 240 may be configured to allow the device 200 to communicate with one or more devices (or systems) according to one or more protocols. In one example, the communication interface 240 may be a wired interface, such as an Ethernet interface or a high-definition serial-digital-interface (HD-SDI). As another example, the communication interface 240 may be a wireless interface, such as a cellular, Bluetooth, or Wi-Fi interface. In some examples, the communication interface may include one or more antennas, and may be configured to transmit and receive RF signals.

Data bus 250 may include one or more wires, traces, or other mechanisms for communicatively coupling the processor 210, memory 220, user interface 230, and communication interface 240, and/or any other applicable computing device component.

Figure 3:
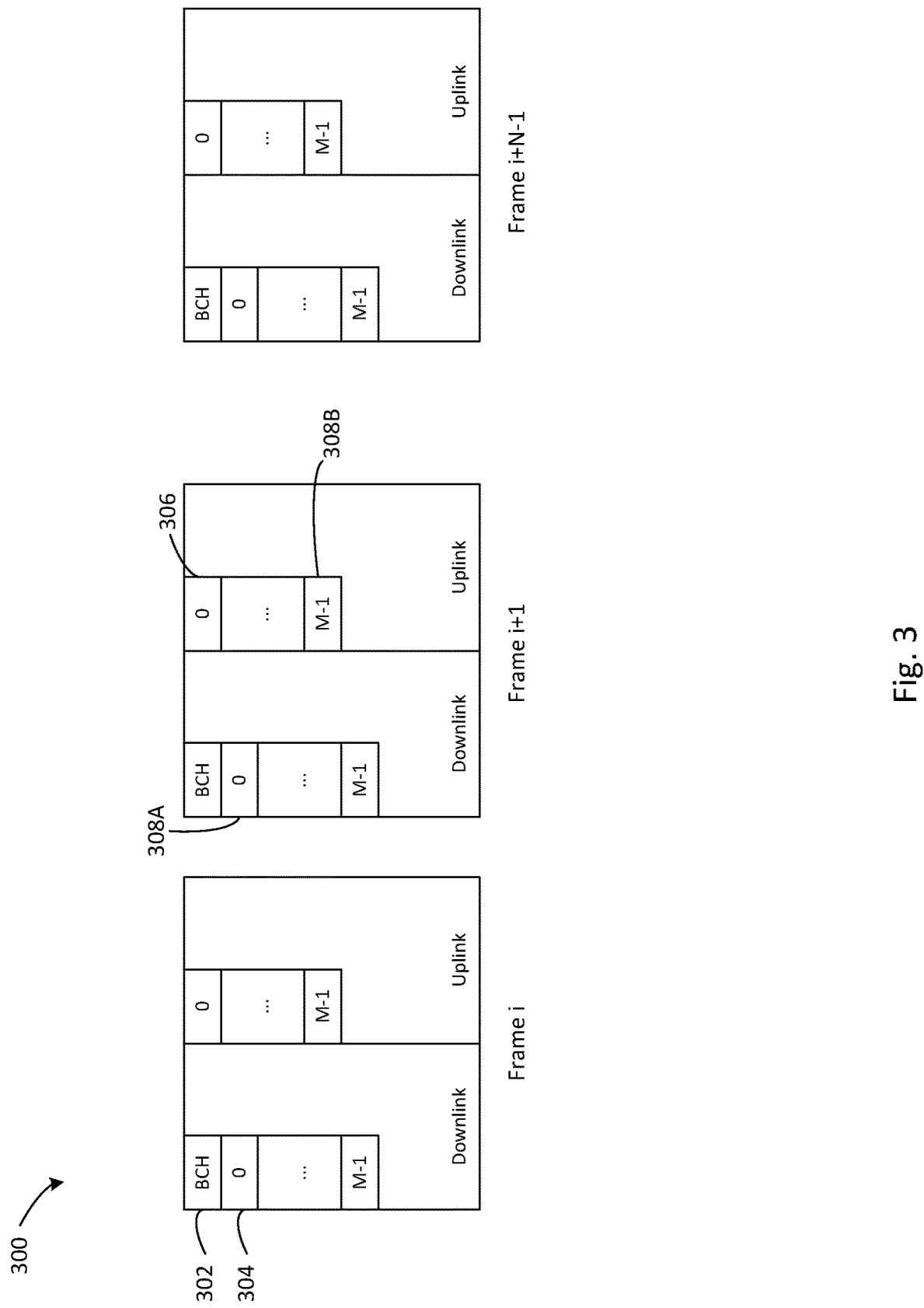
FIG. 3 is a simplified block diagram illustrating an example frame scheme, in accordance with some embodiments.

FIG. 3 is a simplified block diagram illustrating an example frame scheme 300 according to some embodiments. The first wireless audio device 110 (e.g., a wireless base station) may be configured to combine the audio data and the control data into frames, which are then transmitted or broadcast to the plurality of second wireless audio devices 120A-I (e.g., wireless subscriber devices). Each frame can include a downlink portion and an uplink portion. In some examples, the frames are evenly split between a downlink portion and an uplink portion. In other examples, the downlink portion is larger than the uplink portion (i.e., has more data capacity), or vice versa.

The wireless audio system operates according to the frame scheme 300, wherein frames are repeated in a pattern. For example, scheme 300 includes N frames, and illustrates a first frame i, a second frame i+1, and a final frame i+N−1. The scheme then repeats again with frame i, after transmitting frame i+N−1.

It should be appreciated that the illustrated example of FIG. 3 is only one example provided to illustrate certain features, and that many other examples can be used while remaining within the scope of the present disclosure.

The example frame scheme shown in FIG. 3 illustrates that each frame includes a plurality of slots, and capacity for audio data. In one example, each frame of the frame scheme 300 includes a broadcast channel slot 302. The broadcast channel slot 302 includes information used by the one or more of the second wireless audio devices 120A-I to access the audio system 100, including the number of frames N in the frame scheme. This enables each second wireless audio device 120A-I to determine when the frames will repeat. The broadcast channel slot can also include various other information used by the second wireless audio devices 120A-I to access the audio system 100.

The plurality of frames in the frame scheme 300 also include, in some examples, one or more slots that are reserved for common control channels (e.g., a random access channel 306 and/or common control channel slot 304). These slots can be shared, such that each of the plurality of second wireless audio devices 120A-I has access to these slots. The random access channel slot 306 and/or common control channel slot 304 can be included in every frame of the frame scheme 300, or may be included in only a subset of the frames (e.g., only in the first frame of the scheme).

In some examples, the plurality of frames in the frame scheme 300 also include a plurality of control channel slot pairs. Each control channel slot pair corresponds to one of the plurality of second wireless audio devices 120A-I. In the illustrated example, each frame includes M control channel slot pairs. Each control channel slot pair includes a first slot in the uplink portion of the frame, and a second slot in the downlink portion of the frame. For example, a first control channel slot pair includes a first slot 308A in the uplink portion of frame i+1, and a second slot 308B in the downlink portion of frame i+1.

In the illustrated example, the frame scheme 300 includes N frames. Each of the N frames can include M channel slot pairs. Thus, the frame scheme 300 can support M×N separate second wireless audio devices. However, one or more of the N frames includes the shared slots (e.g., the common control channel 304 and/or the random access channel 306), reducing the total number of supported second wireless audio devices.

In some examples, the parameters N (i.e., the number of frames in the frame scheme) and M (i.e., the number of control channel slot pairs in a given frame) are selected by a user at configuration time. That is, these parameters are changeable based on the requirements of the environment in which they are used, and can be modified at will to ensure that the desired operational characteristics of latency, audio data throughput, and more are met. The selected values for M and N can be based on a desired maximum number of audio channels needed, while still meeting system requirements for control channel bit rate and latency. For example, if fewer wireless subscriber devices are needed, M can be reduced to decrease the control channel latency. Alternatively, if more wireless subscriber devices are used, latency can be increased to accommodate the additional wireless subscriber devices while maintaining an adequate audio data bit rate.

In some examples, each second wireless audio device receives control information specific to that device only in one of every N frames. As such, the greater number of frames N in the frame scheme, the longer the delay (i.e., latency) between frames containing control data for a given second wireless audio device.

Alternatively, where fewer frames N are used, but the number of control channel pair slots M are included in each frame, the available capacity in each frame for audio data is reduced. Thus, while control latency is reduced, the audio data bit rate is also reduced. Thus a balance must be struck, where latency is increased (i.e., additional frames N are added) so that there is less overhead in a given frame (i.e., less control channel pair slots M).

Figure 4:
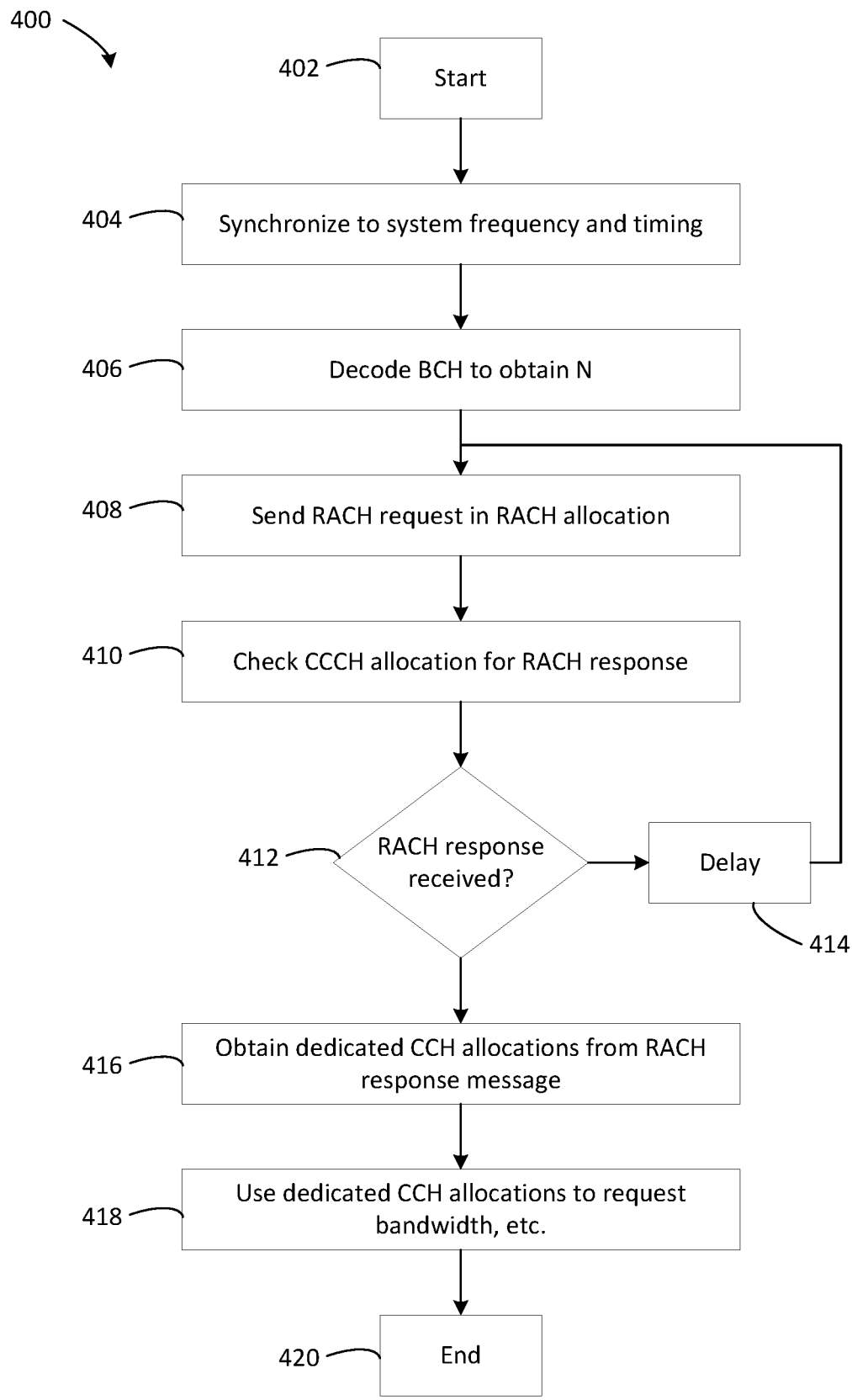
FIGS. 4 and 5 are flowcharts illustrating various operations for wirelessly transmitting audio and control information using a low overhead, in-band control channel approach, in accordance with some embodiments.

FIG. 4 illustrates a flowchart of an example method 400 according to embodiments of the present disclosure. Method 400 may enable a wireless audio system to make use of low overhead in-band control data transmission along with audio data, without the limitations of existing approaches for transmitting audio data and control data. Method 400 details a network entry process for a wireless subscriber device to join the system. The flowchart of FIG. 4 is representative of machine readable instructions that are stored in memory (such as memory 220) and may include one or more programs which, when executed by a processor (such as processor 210) may cause a computing device 200 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 includes synchronizing to system frequency and timing. This is performed by the wireless subscriber device attempting network entry into the audio system.

At block 406, method 400 includes decoding the broadcast channel (e.g., BCH 302 in FIG. 3). The decoded BCH information enables the wireless subscriber device to determine the value of N, or the number of frames N in the frame scheme. This enables the wireless subscriber device to determine when the next repeated frame will occur.

At block 408, method 400 includes sending a random access channel (RACH) request in the slot allocated for random access (e.g., slot 306 in FIG. 3). The RACH request includes a request for an allocation of a dedicated control channel pair to be associated with the wireless subscriber device.

At block 410, method 400 includes the wireless subscriber device monitoring the common control channel (CCCH) slot for a RACH response.

At block 412, method 400 includes determining whether a response has been received on the CCCH. If no response is received, method 400 includes delaying for a random time period at block 414. Method 400 then proceeds back to block 408, at which a new RACH request is sent by the wireless subscriber device.

If a RACH response is received by the wireless subscriber device at block 412, method 400 proceeds to block 416. At block 416, the wireless subscriber device obtains a dedicated control channel pair allocation (e.g., slots 308A and 308B in FIG. 3) based on the RACH response.

At block 418, method 400 then includes the wireless subscriber device using the dedicated control channel pair to perform one or more actions such as requesting bandwidth.

Method 400 then ends at block 420.

Figure 5:
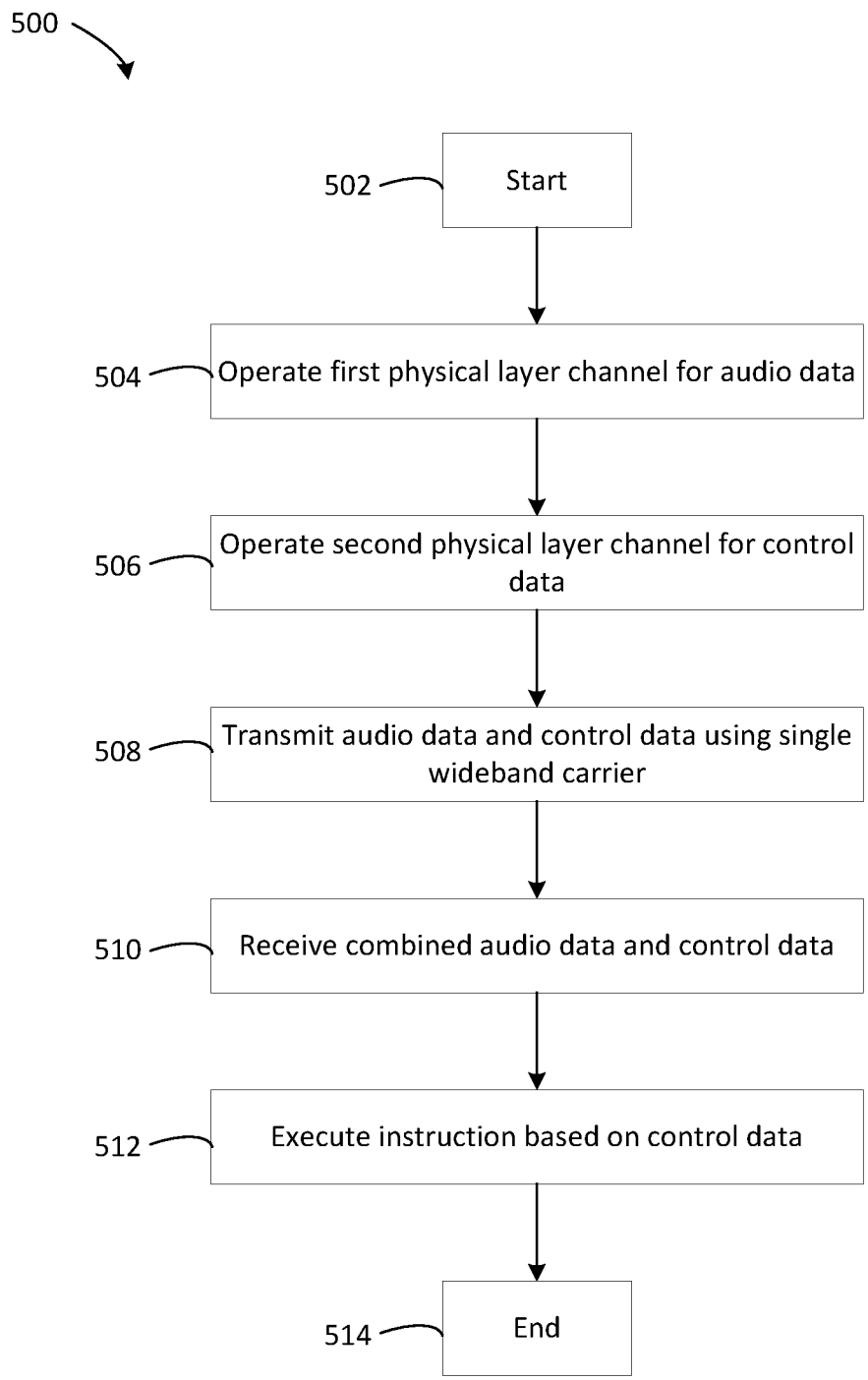

FIG. 5 illustrates a flowchart of an example method 500 according to embodiments of the present disclosure. Method 500 may enable a wireless audio system to make use of low overhead in-band control data transmission along with audio data, without the limitations of existing approaches for transmitting audio data and control data. Method 500 details a method for transmitting both audio and control data from a wireless base station to a wireless subscriber device. The flowchart of FIG. 5 is representative of machine readable instructions that are stored in memory (such as memory 220) and may include one or more programs which, when executed by a processor (such as processor 210) may cause a computing device 200 and/or one or more systems or devices to carry out one or more functions described herein. While the example program is described with reference to the flowchart illustrated in FIG. 5, many other methods for carrying out the functions described herein may alternatively be used. For example, the order of execution of the blocks may be rearranged or performed in series or parallel with each other, blocks may be changed, eliminated, and/or combined to perform method 500. Further, because method 500 is disclosed in connection with the components of FIGS. 1-3, some functions of those components will not be described in detail below.

Method 500 starts at block 502. At block 504, method 500 includes operating a first physical layer channel for audio data. At block 506, method 500 includes operating a second physical layer channel for control data. The physical layer channels for the control data and the audio data may be separate from each other, and the control data may correspond to the audio data (i.e., including instructions to change wireless subscriber device playback volume, timing, etc.).

At block 508, method 500 includes transmitting the audio data and the control data from the separate physical layers using a single wideband carrier. At block 510, method 500 includes a wireless subscriber device receiving the combined audio data and control data. The wireless subscriber device can then decode and/or process the received data to determine whether there is a command included in the data. At block 512, method 500 includes the wireless subscriber device executing an instruction (e.g., change volume) based on the received control data. Method 500 then ends at block 514.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless audio device comprising:
a processor configured to:
communicate using a frame scheme comprising a plurality of frames, wherein each of the plurality of frames includes a broadcast channel slot;
receive a physical layer parameter included in the broadcast channel slot;
determine a modulation scheme corresponding to a control channel based on the physical layer parameter; and
decode control data received via the control channel using the modulation scheme.

2. The wireless audio device of claim 1, wherein the physical layer parameter is a first physical layer parameter and the modulation scheme is a first modulation scheme, the processor further configured to:
receive a second physical layer parameter included in the broadcast channel slot; and
determine a second modulation scheme corresponding to an audio channel based on the second physical layer parameter.

3. The wireless audio device of claim 2, the processor further configured to:
decode audio data received via the audio channel using the second modulation scheme.

4. The wireless audio device of claim 2, wherein the first modulation scheme is different from the second modulation scheme.

5. The wireless audio device of claim 1, wherein each frame includes a downlink portion and an uplink portion, and wherein the frame scheme repeats every N frames, wherein N is an integer greater than or equal to 1.

6. The wireless audio device of claim 1, wherein the physical layer parameter includes information used to access an audio system, including a number of frames N in the frame scheme, wherein N is an integer greater than or equal to 1.

7. The wireless audio device of claim 1, wherein the processor is further configured to:
operate separate physical layer channels for second audio data and second control data; and
transmit the second audio data and the second control data using a single wideband carrier.

8. The wireless audio device of claim 1, wherein the processor is further configured to:
encode second control data; and
transmit the encoded second control data via the control channel using the modulation scheme.

9. A wireless audio device comprising:
a processor configured to:
operate a first physical layer channel using audio data having a first modulation scheme;
operate a second physical layer channel using control data having a second modulation scheme;
modify the second modulation scheme of the control data based on a desired control data latency; and
transmit the audio data and the control data using a single wideband carrier.

10. The wireless audio device of claim 9,
wherein the wireless audio device comprises a base station configured to connect to a recorder or mixer; and
wherein the processor is further configured to:
receive second audio data and second control data on the single wideband carrier; and
decode the second audio data and the second control data.

11. The wireless audio device of claim 9, wherein the first modulation scheme is different from the second modulation scheme.

12. The wireless audio device of claim 9, wherein the processor is further configured to use different coding rates for the control data and the audio data.

13. The wireless audio device of claim 12, wherein the processor is further configured to determine one or both of a coding rate for the audio data and a coding rate for the control data based on a desired bit error rate.

14. The wireless audio device of claim 9, wherein the processor is further configured to communicate using a frame scheme comprising a plurality of frames, wherein each of the plurality of frames includes a broadcast channel slot.

15. A method of operating a wireless audio device of an audio system, the method comprising:
    operating a first physical layer channel using audio data having a first modulation scheme;
    operating a second physical layer channel using control data having a second modulation scheme;
    modifying the second modulation scheme of the control data based on a desired capacity of the audio system; and
    transmitting the audio data and the control data using a single wideband carrier.

16. The method of claim 15, wherein the first modulation scheme is different from the second modulation scheme.

17. The method of claim 15, wherein the audio data and the control data have different coding rates.

18. The method of claim 15, further comprising:
    operating the wireless audio device using a frame scheme comprising a plurality of frames, wherein each of the plurality of frames includes a broadcast channel slot.

19. The method of claim 18, wherein the broadcast channel slot includes a physical layer parameter corresponding to one or both of the first physical layer channel and the second physical layer channel.

20. The method of claim 15, further comprising:
    receiving second audio data and second control data on the single wideband carrier; and
    decoding the second audio data and the second control data.

* * * * *